US012392362B2

(12) United States Patent
Yin

(10) Patent No.: US 12,392,362 B2
(45) Date of Patent: Aug. 19, 2025

(54) ROTATION CONTROL SYSTEM AND METHOD FOR EXCAVATOR

(71) Applicant: Xuzhou XCMG Excavator Machinery Co., Ltd., Jiangsu (CN)

(72) Inventor: Chao Yin, Jiangsu (CN)

(73) Assignee: Xuzhou XCMG Excavator Machinery Co., Ltd., Jiangsu (CN)

( * ) Notice: Subject to any disclaimer, the term of this patent is extended or adjusted under 35 U.S.C. 154(b) by 39 days.

(21) Appl. No.: 18/337,025

(22) Filed: Jun. 18, 2023

(65) Prior Publication Data

US 2023/0332626 A1 Oct. 19, 2023

(30) Foreign Application Priority Data

Sep. 19, 2022 (CN) ......................... 202211137015.3

(51) Int. Cl.

| | |
|---|---|
| ***F15B 15/00*** | (2006.01) |
| ***E02F 9/12*** | (2006.01) |
| ***E02F 9/22*** | (2006.01) |
| ***E02F 9/26*** | (2006.01) |
| ***F15B 13/044*** | (2006.01) |
| ***F15B 19/00*** | (2006.01) |

(52) U.S. Cl.

CPC .............. *F15B 15/00* (2013.01); *E02F 9/123* (2013.01); *E02F 9/2228* (2013.01); *E02F 9/2267* (2013.01); *E02F 9/2285* (2013.01); *E02F 9/2296* (2013.01); *E02F 9/26* (2013.01); *F15B 13/044* (2013.01); *F15B 19/005* (2013.01)

(58) Field of Classification Search

CPC F15B 15/00; F15B 13/0433; F15B 2211/327; F15B 21/045; E02F 9/2285; E02F 9/2267; E02F 9/2228

See application file for complete search history.

(56) References Cited

FOREIGN PATENT DOCUMENTS

| | | | |
|---|---|---|---|
| JP | 2021110135 A | * | 8/2021 |
| KR | 102483280 B1 | * | 12/2022 |

* cited by examiner

*Primary Examiner* — Nathaniel E Wiehe
*Assistant Examiner* — Daniel S Collins
(74) *Attorney, Agent, or Firm* — JCIPRNET

(57) ABSTRACT

Disclosed are a novel rotation control system and method for an excavator. The novel rotation control system comprises a controller, an electrical control handle, an instrument, a rotating motor, a rotating valve trim, a main pump, a first electromagnetic valve, a second electromagnetic valve, a first pilot pressure sensor, a second pilot pressure sensor, an overflow valve and a one-way valve, and further comprises a rotation sensor used for detecting whether an excavator is rotating, a regulator used for controlling the displacement of the main pump, and a temperature sensor used for monitoring the temperature of hydraulic oil in real time.

16 Claims, 2 Drawing Sheets

ROTATION CONTROL SYSTEM AND METHOD FOR EXCAVATOR

CROSS-REFERENCE TO RELATED APPLICATION

This application claims the priority benefit of China application no. 202211137015.3, filed on Sep. 19, 2022. The entirety of the above-mentioned patent application is hereby incorporated by reference herein and made a part of this specification.

BACKGROUND OF THE INVENTION

1. Technical Field

The invention relates to the technical field of engineering machines, in particular to a novel rotation control system and method for an excavator.

2. Description of Related Art

The rotation of excavators is controlled generally through the following method: a rotating handle is pushed, then a shift signal of the rotating handle is input to a main controller of the excavator, and the main controller of the excavator controls the rotation speed according to the shift of the rotating handle. However, during an actual rotation process, various unexpected situations and faults may occur, and will affect normal operation of the excavator and increase safety risks.

For example, (1) when a rotating valve trim of the excavator is jammed, the excavator will rotate automatically and will not stop, and in this case, an operator cannot find and handle the fault in time due to the failure to receive any fault feedback information, leading to an accident.

(2) The two ends of a rotating valve trim of a main valve for controlling the rotation of the excavator are controlled by electromagnetic valves; when the excavator does not rotate, the rotating valve trim will move in case of a fault of the electromagnetic valves for controlling the rotating valve trim, which in turn leads to rotation of the excavator, causing an accident.

(3) When the excavator works under a low temperature conditions, the viscosity of hydraulic oil will increase with the decease of the temperature, leading to a delay of rotation startup or stop.

(4) When the excavator rotates, whether the current output by a controller to the electromagnetic valves at the two ends of the rotating valve trim is consistent with the current that is actually input to the rotating valve trim cannot be determined, and whether the secondary pressure actually output by the electromagnetic valves is consistent with the secondary pressure theoretically output by the electromagnetic valves cannot be determined either. When the electromagnetic valves are abraded after long-term use, faults of the electromagnetic valves will not be automatically diagnosed and corrected.

(5) When the excavator rotates, the flow rate of hydraulic oil in the oil inlet of a rotating motor will be maximized instantly at the starting moment of rotation, so part of the hydraulic oil will flow back into a hydraulic oil tank form an overflow valve of the rotating motor, leading to energy waste.

BRIEF SUMMARY OF THE INVENTION

The objective of the invention is to solve the problems in the prior art by providing a novel rotation control system and method for an excavator.

The technical solution adopted by the invention to fulfill the above objective is as follows:

A novel rotation control system for an excavator comprises a controller, an electrical control handle and an instrument which are electrically connected to the controller, and a rotating motor, a rotating valve trim and a main pump which are sequentially connected in series, wherein a first electromagnetic valve and a second electromagnetic valve are disposed at two ends of the rotating valve trim respectively, and the first electromagnetic valve and the second electromagnetic valve are electrically connected to the controller; the first electromagnetic valve is also connected to a first pilot pressure sensor, the first pilot pressure sensor is used for detecting a pressure of the first electromagnetic valve and feeding the pressure of the first electromagnetic valve back to the controller, the second electromagnetic valve is also connected to a second pilot pressure sensor, and the second pilot pressure sensor is used for detecting a pressure of the second electromagnetic valve and feeding the pressure of the second electromagnetic valve back to the controller; a rotation sensor is disposed in the controller and is used for detecting whether an excavator is rotating;

The novel rotation control system further comprises a regulator, and the regulator is used for receiving an instruction from the controller to control a displacement of the main pump;

The novel rotation control system further comprises an overflow valve and a one-way valve which are disposed between the rotating motor and the rotating valve trim, and the overflow valve is used for receiving redundant oil from the main pump and delivering the redundant oil from the main pump to a low-pressure side of the rotating motor;

The novel rotation control system further comprises a temperature sensor disposed in the rotation control system, and the temperature sensor is used for monitoring a temperature of hydraulic oil in real time.

The novel rotation control system for an excavator is simple in structure, reasonable in module layout, and smooth and clear in logical operation, can find abnormal conditions of an excavator during the rotation process timely and effectively, can determine a corresponding fault and perform a corresponding operation to minimize negative effects caused by the fault, can remove the fault automatically, and can also send fault information to an operator in time and display a solution to remove the fault quickly, thus avoiding accidents caused by the failure to find and handle the fault in time.

According to the novel rotation control system for an excavator, the operating state of the rotating valve trim can be monitored through the rotation sensor, the first pilot pressure sensor, the second pilot pressure sensor, the first electromagnetic valve and the second electromagnetic valve, both a sudden fault and a chronic fault can be found in time, and a fault of the electromagnetic valves can be diagnosed and corrected automatically, the problem of a motion delay caused under a low temperature condition can be fed back and solved in time; and when the excavator rotates normally, backflow of oil can be optimized to reduce energy waste.

Further, the electrical control handle is operated to transmit a signal to the controller, and the controller controls a shift of the rotating valve trim through the first electromagnetic valve and the second electromagnetic valve.

Further, a fault determination method of the rotation control system comprises: detecting a secondary pressure of the first electromagnetic valve and the second electromagnetic valve by the first pilot pressure sensor and the second pilot pressure sensor respectively, and diagnosing whether the first electromagnetic valve and the second electromagnetic valve are abnormal according to the temperature of the hydraulic oil and an actual relationship between a current actually output to the first electromagnetic valve and the second electromagnetic valve by the controller and the secondary pressure output by the first electromagnetic valve and the second electromagnetic valve and correcting an abnormality, by the controller.

Further, whether the secondary pressure actually output by the first electromagnetic valve or the second electromagnetic valve is abnormal is determined according to the actual relationship and an inherent current-secondary pressure curve of the first electromagnetic valve and the second electromagnetic valve, to realize an automatic fault diagnosis function; and a fault and a solution are pushed to the instrument to be displayed to provide an explicit prompt for an operator.

Further, when the first electromagnetic valve or the second electromagnetic valve is abraded due to long-term operation, the secondary pressure output by the first electromagnetic valve or the second electromagnetic valve will be lower than a theoretical value, at this moment, the current output by the controller will be increased to compensate for the decrease of the secondary pressure caused by abrasion of the first electromagnetic valve or the second electromagnetic valve, such that automatic correction of the first electromagnetic valve or the second electromagnetic valve is realized; and if the secondary pressure output by the first electromagnetic valve or the second electromagnetic valve does not change with the current, it is determined that the first electromagnetic valve or the second electromagnetic valve is jammed, and a fault and a solution are pushed to the instrument to be displayed to provide an explicit prompt for an operator.

Further, the electrical control handle is not rotated, the excavator will rotate if the rotating valve trim is jammed at a non-central position, the rotation sensor detects the rotation of the excavator, at this moment, the controller controls the regulator to minimize the displacement of the main pump, so as to minimize a rotation speed to enable the rotating motor to rotate at an extremely low speed, relevant fault information is pushed to the instrument to remind an operator of a fault, and a solution is displayed.

Further, when an operator does not perform a rotation operation, if an output pressure of the first electromagnetic valve or the second electromagnetic valve is not zero due to a fault of the first electromagnetic valve or the second electromagnetic valve, the controller monitors, through the first pilot pressure sensor and the second pilot pressure sensor, that pilot pressures at the two ends of the rotating valve trim are abnormal, at this moment, the controller forcibly outputs a current to the first electromagnetic valve or the second electromagnetic valve until the pilot pressures at the two ends of the rotating valve trim are equal, and this state is maintained to enable the excavator to stop rotating automatically.

Further, when it is monitored that the excavator is working under a low temperature condition, the controller sends an instruction to increase an output current of the first electromagnetic valve and the second electromagnetic valve at the beginning of rotation to avoid a delay of rotation startup caused by a longer pilot pressure building time of the first pilot pressure sensor and the second pilot pressure sensor and a longer reversing time of the valve trim.

Further, when it is monitored that the excavator is working under a low temperature condition, the rotating valve trim will return at the end of rotation, in this process, a pilot pressure of one end of the rotating valve trim is released, and a current is output to the electromagnetic valve at the other end of the rotating valve trim at the same time to enable the rotating valve trim to return to the center more quickly, such that a delay of rotation stop is avoided.

Further, when the excavator rotates, the regulator controls the displacement of the main pump at the beginning of the rotation to prolong a loading time of the hydraulic oil in an oil inlet of the rotating motor to decrease the flow rate of the hydraulic oil flowing back into a hydraulic oil tank from the overflow valve of the rotating motor, such that energy of a hydraulic system is saved; and two groups of overflow valves and one-way valves are connected in parallel and are located at two ends of the rotating motor respectively.

In the figures: 1, instrument; 2, controller; 3, first pilot pressure sensor; 4, second pilot pressure sensor; 5, first electromagnetic valve; 6, overflow valve; 7, one-way valve; 8, rotating motor; 9, rotating valve trim; 10, second electromagnetic valve; 11, regulator; 12, main pump; 13, temperature sensor; 14, electrical control handle.

DETAILED DESCRIPTION OF THE INVENTION

The technical solution of the invention will be clearly and completely described below in conjunction with the accompanying drawings of the invention. Obviously, the embodiments in the following description are merely illustrative ones, and are not all possible ones of the invention. All other embodiments obtained by those ordinarily skilled in the art according to the following ones without creative labor should fall within the protection scope of the invention.

It should be noted that, in the description of the invention, terms such as “middle”, “upper”, “lower”, “left”, “right”, “inner” and “outer” are used to indicate directional or positional relations based on the accompanying drawings merely for the purpose of facilitating and simplifying the description of the invention, and do not indicate or imply that devices or elements referred to must be in a specific direction, or be configured and operated in a specific direction, and thus, they should not be construed as limitations of the invention. In addition, terms such as “first” and “second” are merely for the purpose of description, and should not be construed as indicting or implying relative importance.

Figure 1:
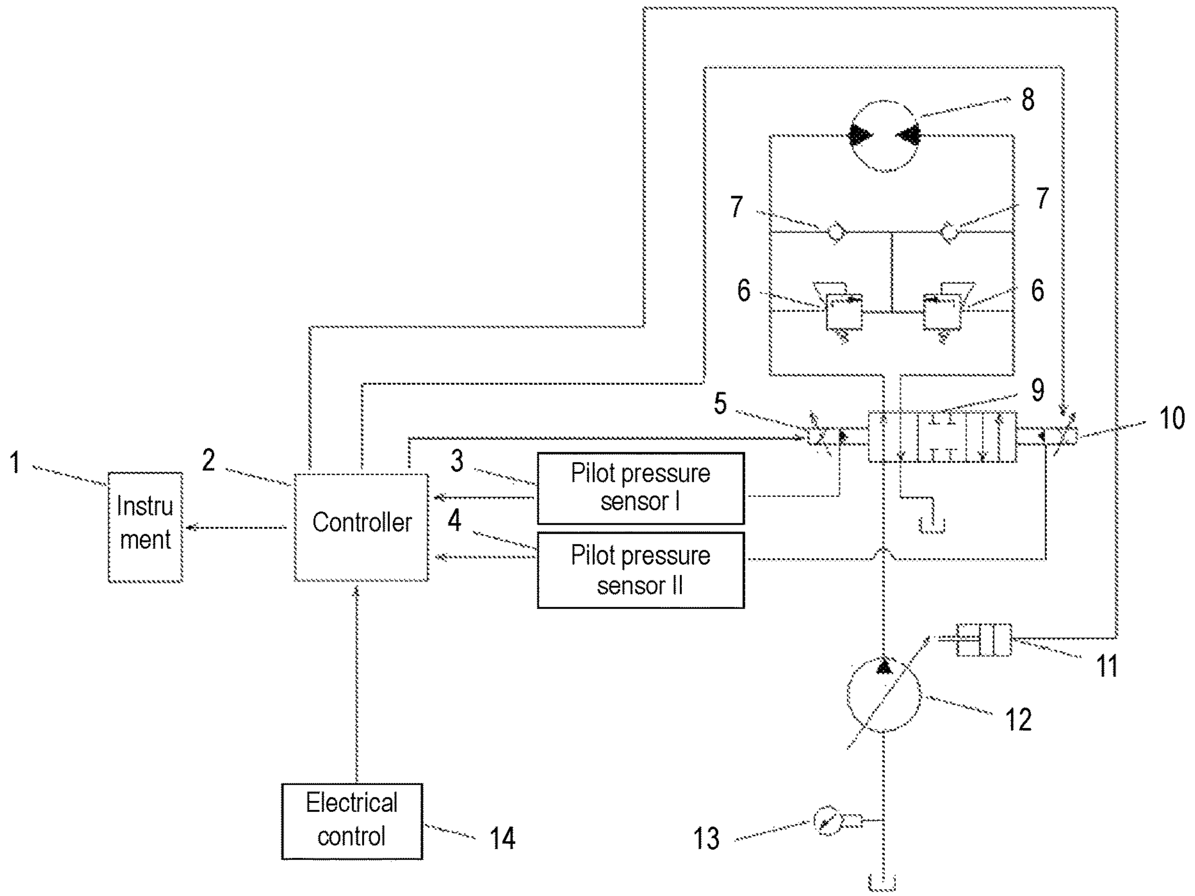
FIG. 1 is a schematic diagram of the control strategy of a novel rotation control system for an excavator according to the invention.
Figure 2:
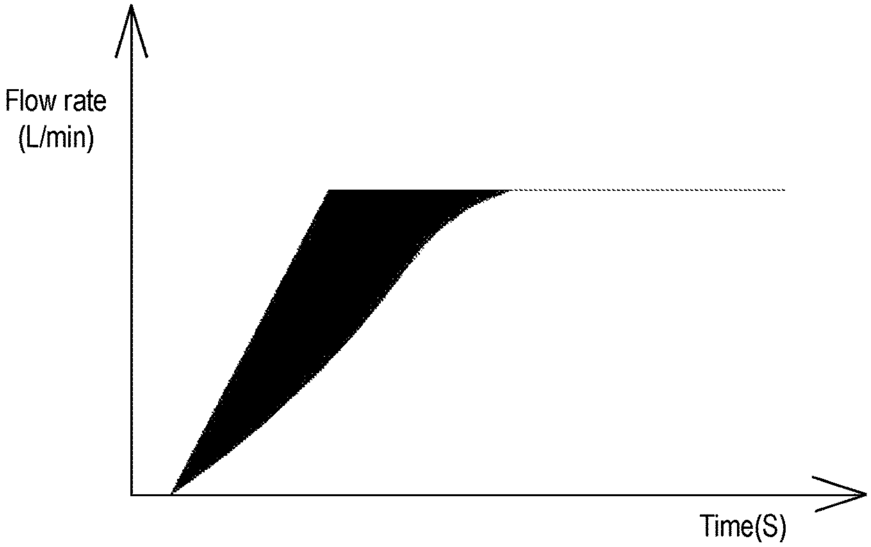
FIG. 2 illustrates an overflow energy-saving curve during rotation according to the invention.
Figure 3:
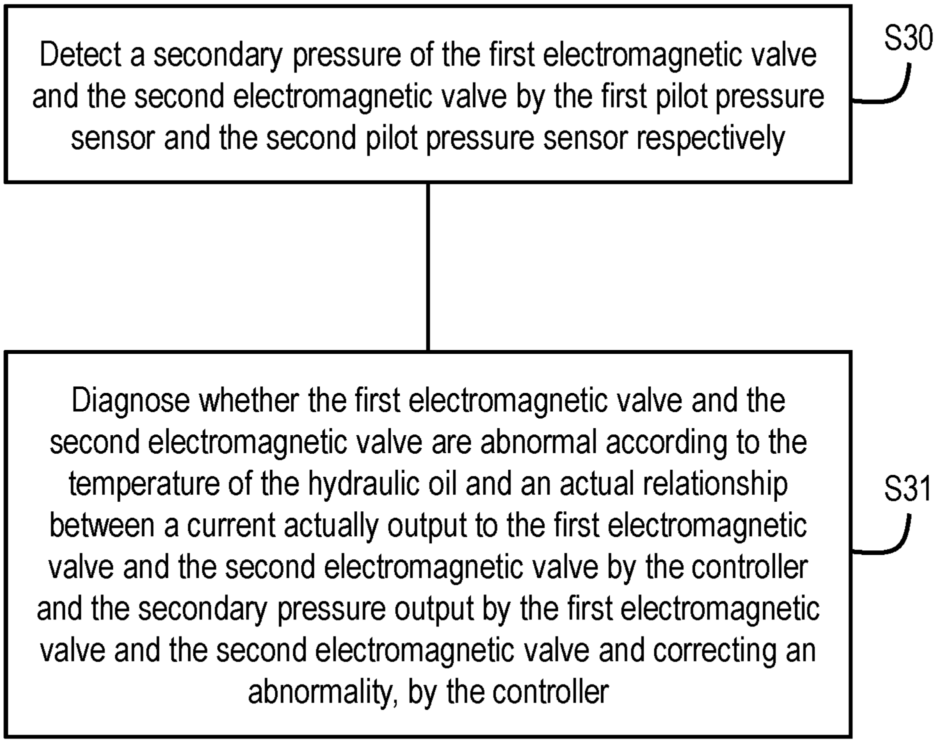
FIG. 3 illustrates a flowchart of a novel rotation control method according to the invention.

As shown in FIG. 1 and FIG. 2, the invention provides a novel rotation control system and method for an excavator. The novel rotation control system for an excavator comprises a controller 2, an electrical control handle 14 and an instrument 1 which are electrically connected to the controller 2, and a rotating motor 8, a rotating valve trim 9 and a main pump 12 which are sequentially connected in series, wherein a first electromagnetic valve 5 and a second electromagnetic valve 10 are disposed at two ends of the rotating valve trim 9 respectively, and the first electromagnetic valve 5 and the second electromagnetic valve 10 are electrically connected to the controller 2; the first electromagnetic valve 5 is also connected to a first pilot pressure sensor 3, the first pilot pressure sensor 3 is used for detecting the pressure of the first electromagnetic valve and feeding the pressure of the first electromagnetic valve back to the controller 2, the second electromagnetic valve 10 is also connected to a second pilot pressure sensor 4, and the second pilot pressure sensor 4 is used for detecting the pressure of the second electromagnetic valve 10 and feeding the pressure of the second electromagnetic valve 10 back to the controller 2; a rotation sensor is disposed in the controller 2 and is used for detecting whether an excavator is rotating;

The novel rotation control system further comprises a regulator 11, and the regulator 11 is disposed in the vicinity of the main pump 12 and controls the displacement of the main pump 12 according to a rotation instruction of the controller 2;

The novel rotation control system further comprises an overflow valve 6 and a one-way valve 7 which are disposed between the rotating motor 8 and the rotating valve trim 9, and the overflow valve 6 is used for receiving redundant oil from the main pump 12 and delivering the redundant oil from the main pump 12 to a low-pressure side of the rotating motor 8;

The novel rotation control system further comprises a temperature sensor disposed in the rotation control system, and the temperature sensor is used for monitoring the temperature of hydraulic oil in real time.

The novel rotation control system for an excavator is simple in structure, reasonable in module layout, and smooth and clear in logical operation, can find abnormal conditions of an excavator during the rotation process timely and effectively, can determine a corresponding fault and perform a corresponding operation to minimize negative effects caused by the fault, can remove the fault automatically, and can also send fault information to an operator in time and display a solution to remove the fault quickly, thus avoiding accidents caused by the failure to find and handle the fault in time.

Further, when the electrical control handle 14 is operated, the electrical control handle 14 transmits a signal to the controller 2, and the controller 2 controls a shift of the rotating valve trim 9 through the first electromagnetic valve 5 and the second electromagnetic valve 10.

The first pilot pressure sensor 3 and the second pilot pressure sensor 4 detect a secondary pressure of the first electromagnetic valve 5 and the second electromagnetic valve 10 on corresponding sides respectively (S30), and the controller 2 diagnoses whether the first electromagnetic valve and the second electromagnetic valve are abnormal according to the temperature of the hydraulic oil and an actual relationship between a current actually output to the first electromagnetic valve and the second electromagnetic valve by the controller and the secondary pressure output by the first electromagnetic valve and the second electromagnetic valve, and corrects an abnormality (S31). The controller 2 can push relevant fault information to the instrument 1 to remind an operator of a fault and display a solution.

That is to say, whether the secondary pressure actually output by the first electromagnetic valve 5 or the second electromagnetic valve 10 is abnormal is determined according to the actual relationship and an inherent current-secondary pressure curve of the first electromagnetic valve and the second electromagnetic valve, to realize an automatic fault diagnosis function; and the fault and the solution are pushed to the instrument to be displayed to provide an explicit prompt for the operator.

Similarly, when the first electromagnetic valve 5 or the second electromagnetic valve 10 is abraded due to long-term operation, the secondary pressure output by the first electromagnetic valve 5 or the second electromagnetic valve 10 will be lower than the theoretical value, and at this moment, the current output by the controller 2 will be increased to compensate for the decrease of the secondary pressure caused by abrasion of the first electromagnetic valve 5 or the second electromagnetic valve 10, such that automatic correction of the first electromagnetic valve 5 or the second electromagnetic valve 10 is realized; and if the secondary pressure output by the first electromagnetic valve 5 or the second electromagnetic valve 10 does not change with the current, it is determined that the first electromagnetic valve 5 or the second electromagnetic valve 10 is jammed, and a fault and a solution are pushed to the instrument to be displayed to provide an explicit prompt for the operator.

Further, when the electrical control handle is not rotated, the excavator will rotate if the rotating valve trim 9 is jammed at a non-central position, the rotation sensor detects the rotation of the excavator, at this moment, the controller 2 controls the regulator 11 to minimize the displacement of the main pump 12, so as to minimize the rotation speed to enable the rotating motor 8 to rotate at an extremely low speed, and relevant fault information is pushed to the instrument to remind the operator of a fault, and a solution is displayed. In this way, in case of abnormal rotation, the loss caused by the fault can be minimized.

Further, when the operator does not perform a rotation operation, if an output pressure of the first electromagnetic valve 5 or the second electromagnetic valve 10 is not zero due to a fault of the first electromagnetic valve 5 or the second electromagnetic valve 10, the controller 2 monitors, through the first pilot pressure sensor 3 and the second pilot pressure sensor 4, that pilot pressures at the two ends of the rotating valve trim 9 are abnormal, at this moment, the controller 2 forcibly outputs a current to the first electromagnetic valve 5 or the second electromagnetic valve 10 until the pilot pressures at the two ends of the rotating valve trim 9 are equal, and this state is maintained to enable the excavator to stop rotating automatically, such that an accident is prevented.

Further, when rotation is started, if it is monitored that the excavator is working under a low temperature condition, the viscosity of the hydraulic oil will increase with the decrease of the temperature, and the fluidity of the hydraulic oil is decreased. Different from the normal temperature condition, the controller 2 sends an instruction to increase the output current of the first electromagnetic valve 5 and the second electromagnetic valve 10 to solve the problem that the pilot pressure building time is prolonged due to the increase of the viscosity of the hydraulic oil and that the reversing time of the valve trim is prolonged due to the increase of reversing resistance between the rotating valve trim 9 and the valve body, such that a delay of rotation startup is avoided.

Further, when the rotation is stopped, if it is monitored that the excavator is working under a low temperature condition, the rotating valve trim will return, in this process, the pilot pressure of one end of the rotating valve trim 9 is released, and a current is output to the electromagnetic valve at the other end of the rotating valve trim at the same time to enable the rotating valve trim 9 to return to the center more quickly, such that a delay of rotation stop is avoided.

Further, during the rotation process of the excavator, the regulator 11 controls the displacement of the main pump 12 at the beginning of the rotation to prolong the loading time of the hydraulic oil in an oil inlet of the rotating motor 8 to decrease of the flow rate of the hydraulic oil flowing back into a hydraulic oil tank from the overflow valve 6 of the rotating motor 8, such that energy waste is reduced.

Compared with the prior art, the invention has the following beneficial effects: 1, the novel rotation control system for an excavator is simple in structure, reasonable in module layout, and smooth and clear in logical operation, can find abnormal conditions of an excavator during the rotation process timely and effectively, can determine a corresponding fault and perform a corresponding operation to minimize negative effects caused by the fault, can remove the fault automatically, and can also send fault information to an operator in time and display a solution to remove the fault quickly, thus avoiding accidents caused by the failure to find and handle the fault in time; 2, the rotation sensor mounted in the controller can detect rotation of the excavator caused by rotation of the rotating valve trim jammed at a non-central position, in this case, the displacement of the main pump is minimized through the controller to minimize the rotation speed to enable the rotating motor to rotate at an extremely low speed, and relevant fault information is pushed to the instrument to remind an operator of a fault, and a solution is displayed; 3, in case of a fault of the electromagnetic valves used for controlling the rotating valve trim, the controller will forcibly output a current to the first electromagnetic valves until pilot pressures at the two ends of the rotating valve trim are equal, and this state is maintained to prevent the excavator from rotating, such that an accident is prevented; 4, the temperature sensor is mounted in the hydraulic system to monitor the temperature of hydraulic oil in time; when the excavator is working under a low temperature condition, the viscosity of the hydraulic oil will increase with the decrease of the temperature, the fluidity of the hydraulic oil is decreased, and the problem of a delay of rotation startup or stop caused by the increase of the viscosity of the hydraulic oil at a low temperature can be solved by controlling the electromagnetic valves at the two ends of the rotating valve trim; 5, when the electromagnetic valves are abraded due to long-term operation, the secondary pressure output by the electromagnetic valves will be lower than the theoretical value, and at this moment, the current output by the controller will be increased to compensate for the decrease of the secondary pressure caused by abrasion of the electromagnetic valves, such that automatic fault diagnosis and correction of the electromagnetic valves is realized; 6, the flow rate of hydraulic oil flowing back into the hydraulic oil tank from the overflow valve of the rotating motor is decreased at the beginning of rotation, such that energy waste is reduced.

The novel rotation control system for an excavator can find abnormal conditions of an excavator during the rotation process timely and effectively, can determine a corresponding fault and perform a corresponding operation to minimize negative effects caused by the fault, can remove the fault automatically, and can also send fault information to an operator in time and display a solution to remove the fault quickly, thus avoiding accidents caused by the failure to find and handle the fault in time.

Although some embodiments of the invention are illustrated and described above, it can be understood by those ordinarily skilled in the art that various modifications, amendments, substitutions and transformations can be made to these embodiments without departing from the principle and spirit of the invention, and the scope of the invention is defined by the appended claims and their equivalents.

What is claimed is:

1. A novel rotation control method for an excavator, the novel rotation control method being carried out by a novel rotation control system for an excavator, the novel rotation control system comprising a controller, an electrical control handle and an instrument which are electrically connected to the controller, and a rotating motor, a rotating valve trim and a main pump which are sequentially connected in series, wherein a first electromagnetic valve and a second electromagnetic valve are disposed at two ends of the rotating valve trim respectively, and the first electromagnetic valve and the second electromagnetic valve are electrically connected to the controller; the first electromagnetic valve is also connected to a first pilot pressure sensor, the first pilot pressure sensor is used for detecting a pressure of the first electromagnetic valve and feeding the pressure of the first electromagnetic valve back to the controller, the second electromagnetic valve is also connected to a second pilot pressure sensor, and the second pilot pressure sensor is used for detecting a pressure of the second electromagnetic valve and feeding the pressure of the second electromagnetic valve back to the controller; a rotation sensor is disposed in the controller and is used for detecting whether an excavator is rotating;

the novel rotation control system further comprising a regulator, and the regulator being used for receiving an instruction from the controller to control a displacement of the main pump;

the novel rotation control system further comprising an overflow valve and a one-way valve which are disposed between the rotating motor and the rotating valve trim, and the overflow valve being used for receiving redundant oil from the main pump and delivering the redundant oil from the main pump to a low-pressure side of the rotating motor;

the novel rotation control system further comprising a temperature sensor disposed in the rotation control system, and the temperature sensor being used for monitoring a temperature of hydraulic oil in real time, wherein the novel rotation control method comprises a fault determination method of the rotation control system, which comprises: detecting a secondary pressure of the first electromagnetic valve and the second electromagnetic valve by the first pilot pressure sensor and the second pilot pressure sensor respectively, and diagnosing whether the first electromagnetic valve and the second electromagnetic valve are abnormal according to the temperature of the hydraulic oil and an actual relationship between a current actually output to the first electromagnetic valve and the second electromagnetic valve by the controller and the secondary pressure output by the first electromagnetic valve and the second electromagnetic valve and correcting an abnormality, by the controller, when it is monitored that the excavator is working under a low temperature condition, the controller sends an instruction to increase an output current of the first electromagnetic valve and the second electromagnetic valve at the beginning of rotation to compensate for a time loss caused by a longer pilot pressure building time of the first pilot pressure sensor and the second pilot pressure sensor and a longer reversing time of the valve trim.

2. The novel rotation control method for an excavator according to claim 1, wherein whether the secondary pressure actually output by the first electromagnetic valve or the second electromagnetic valve is abnormal is determined according to the actual relationship and an inherent current-secondary pressure curve of the first electromagnetic valve and the second electromagnetic valve, to realize an automatic fault diagnosis function; and a fault and a solution are pushed to the instrument to be displayed to provide an explicit prompt for an operator.

3. The novel rotation control method for an excavator according to claim 2, wherein when the first electromagnetic valve or the second electromagnetic valve is abraded due to long-term operation, the secondary pressure output by the first electromagnetic valve or the second electromagnetic valve will be lower than a theoretical value, at this moment, the current output by the controller will be increased to compensate for the decrease of the secondary pressure caused by abrasion of the first electromagnetic valve or the second electromagnetic valve, such that automatic correction of the first electromagnetic valve or the second electromagnetic valve is realized; and if the secondary pressure output by the first electromagnetic valve or the second electromagnetic valve does not change with the current, it is determined that the first electromagnetic valve or the second electromagnetic valve is jammed, and a fault and a solution are pushed to the instrument to be displayed to provide an explicit prompt for an operator.

4. The novel rotation control method for an excavator according to claim 1, wherein when the first electromagnetic valve or the second electromagnetic valve is abraded due to long-term operation, the secondary pressure output by the first electromagnetic valve or the second electromagnetic valve will be lower than a theoretical value, at this moment, the current output by the controller will be increased to compensate for the decrease of the secondary pressure caused by abrasion of the first electromagnetic valve or the second electromagnetic valve, such that automatic correction of the first electromagnetic valve or the second electromagnetic valve is realized; and if the secondary pressure output by the first electromagnetic valve or the second electromagnetic valve does not change with the current, it is determined that the first electromagnetic valve or the second electromagnetic valve is jammed, and a fault and a solution are pushed to the instrument to be displayed to provide an explicit prompt for an operator.

5. The novel rotation control method for an excavator according to claim 1, wherein when the electrical control handle is not rotated, the excavator will rotate if the rotating valve trim is jammed at a non-central position, the rotation sensor detects the rotation of the excavator, at this moment, the controller controls the regulator to minimize the displacement of the main pump, so as to minimize a rotation speed to enable the rotating motor to rotate at an extremely low speed, relevant fault information is pushed to the instrument to remind an operator of a fault, and a solution is displayed.

6. The novel rotation control method for an excavator according to claim 1, wherein when an operator does not perform a rotation operation, if an output pressure of the first electromagnetic valve or the second electromagnetic valve is not zero due to a fault of the first electromagnetic valve or the second electromagnetic valve, the controller monitors, through the first pilot pressure sensor and the second pilot pressure sensor, that pilot pressures at the two ends of the rotating valve trim are abnormal, at this moment, the controller forcibly outputs a current to the first electromagnetic valve or the second electromagnetic valve until the pilot pressures at the two ends of the rotating valve trim are equal, and this state is maintained to enable the excavator to stop rotating automatically.

7. The novel rotation control method for an excavator according to claim 1, wherein when it is monitored that the excavator is working under a low temperature condition, the rotating valve trim will return at the end of rotation, in this process, a pilot pressure of one end of the rotating valve trim is released, and a current is output to the electromagnetic valve at the other end of the rotating valve trim at the same time to enable the rotating valve trim to return to a center more quickly, such that a delay of rotation stop is avoided.

8. The novel rotation control method for an excavator according to claim 1, wherein when the excavator rotates, the regulator controls the displacement of the main pump at the beginning of the rotation to prolong a loading time of the hydraulic oil in an oil inlet of the rotating motor to decrease of the flow rate of the hydraulic oil flowing back into a hydraulic oil tank from the overflow valve of the rotating motor; and two groups of said overflow valves and said one-way valves are connected in parallel and are located at two ends of the rotating motor respectively.

9. A novel rotation control method for an excavator, the novel rotation control method being carried out by a novel rotation control system for an excavator, the novel rotation control system comprising a controller, an electrical control handle and an instrument which are electrically connected to the controller, and a rotating motor, a rotating valve trim and a main pump which are sequentially connected in series, wherein a first electromagnetic valve and a second electromagnetic valve are disposed at two ends of the rotating valve trim respectively, and the first electromagnetic valve and the second electromagnetic valve are electrically connected to the controller; the first electromagnetic valve is also connected to a first pilot pressure sensor, the first pilot pressure sensor is used for detecting a pressure of the first electromagnetic valve and feeding the pressure of the first electromagnetic valve back to the controller, the second electromagnetic valve is also connected to a second pilot pressure sensor, and the second pilot pressure sensor is used for detecting a pressure of the second electromagnetic valve and feeding the pressure of the second electromagnetic valve back to the controller; a rotation sensor is disposed in the controller and is used for detecting whether an excavator is rotating;

the novel rotation control system further comprising a regulator, and the regulator being used for receiving an instruction from the controller to control a displacement of the main pump;

the novel rotation control system further comprising an overflow valve and a one-way valve which are disposed between the rotating motor and the rotating valve trim, and the overflow valve being used for receiving redundant oil from the main pump and delivering the redundant oil from the main pump to a low-pressure side of the rotating motor;

the novel rotation control system further comprising a temperature sensor disposed in the rotation control system, and the temperature sensor being used for monitoring a temperature of hydraulic oil in real time, wherein the electrical control handle is operated to transmit a signal to the controller, and the controller controls a shift of the rotating valve trim through the first electromagnetic valve and the second electromagnetic valve, wherein the novel rotation control method comprises a fault determination method of the rotation control system, which comprises: detecting a secondary pressure of the first electromagnetic valve and the second electromagnetic valve by the first pilot pressure sensor and the second pilot pressure sensor respectively, and diagnosing whether the first electromagnetic valve and the second electromagnetic valve are abnormal according to the temperature of the hydraulic oil and an actual relationship between a current actually output to the first electromagnetic valve and the second electromagnetic valve by the controller and the secondary pressure output by the first electromagnetic valve and the second electromagnetic valve and correcting an abnormality, by the controller, when it is monitored that the excavator is working under a low temperature condition, the controller sends an instruction to increase an output current of the first electromagnetic valve and the second electromagnetic valve at the beginning of rotation to compensate for a time loss caused by a longer pilot pressure building time of the first pilot pressure sensor and the second pilot pressure sensor and a longer reversing time of the valve trim.

10. The novel rotation control method for an excavator according to claim 9, wherein whether the secondary pressure actually output by the first electromagnetic valve or the second electromagnetic valve is abnormal is determined according to the actual relationship and an inherent current-secondary pressure curve of the first electromagnetic valve and the second electromagnetic valve, to realize an automatic fault diagnosis function; and a fault and a solution are pushed to the instrument to be displayed to provide an explicit prompt for an operator.

11. The novel rotation control method for an excavator according to claim 10, wherein when the first electromagnetic valve or the second electromagnetic valve is abraded due to long-term operation, the secondary pressure output by the first electromagnetic valve or the second electromagnetic valve will be lower than a theoretical value, at this moment, the current output by the controller will be increased to compensate for the decrease of the secondary pressure caused by abrasion of the first electromagnetic valve or the second electromagnetic valve, such that automatic correction of the first electromagnetic valve or the second electromagnetic valve is realized; and if the secondary pressure output by the first electromagnetic valve or the second electromagnetic valve does not change with the current, it is determined that the first electromagnetic valve or the second electromagnetic valve is jammed, and a fault and a solution are pushed to the instrument to be displayed to provide an explicit prompt for an operator.

12. The novel rotation control method for an excavator according to claim 9, wherein when the first electromagnetic valve or the second electromagnetic valve is abraded due to long-term operation, the secondary pressure output by the first electromagnetic valve or the second electromagnetic valve will be lower than a theoretical value, at this moment, the current output by the controller will be increased to compensate for the decrease of the secondary pressure caused by abrasion of the first electromagnetic valve or the second electromagnetic valve, such that automatic correction of the first electromagnetic valve or the second electromagnetic valve is realized; and if the secondary pressure output by the first electromagnetic valve or the second electromagnetic valve does not change with the current, it is determined that the first electromagnetic valve or the second electromagnetic valve is jammed, and a fault and a solution are pushed to the instrument to be displayed to provide an explicit prompt for an operator.

13. The novel rotation control method for an excavator according to claim 9, wherein when the electrical control handle is not rotated, the excavator will rotate if the rotating valve trim is jammed at a non-central position, the rotation sensor detects the rotation of the excavator, at this moment, the controller controls the regulator to minimize the displacement of the main pump, so as to minimize a rotation speed to enable the rotating motor to rotate at an extremely low speed, relevant fault information is pushed to the instrument to remind an operator of a fault, and a solution is displayed.

14. The novel rotation control method for an excavator according to claim 9, wherein when an operator does not perform a rotation operation, if an output pressure of the first electromagnetic valve or the second electromagnetic valve is not zero due to a fault of the first electromagnetic valve or the second electromagnetic valve, the controller monitors, through the first pilot pressure sensor and the second pilot pressure sensor, that pilot pressures at the two ends of the rotating valve trim are abnormal, at this moment, the controller forcibly outputs a current to the first electromagnetic valve or the second electromagnetic valve until the pilot pressures at the two ends of the rotating valve trim are equal, and this state is maintained to enable the excavator to stop rotating automatically.

15. The novel rotation control method for an excavator according to claim 9, wherein when it is monitored that the excavator is working under a low temperature condition, the rotating valve trim will return at the end of rotation, in this process, a pilot pressure of one end of the rotating valve trim is released, and a current is output to the electromagnetic valve at the other end of the rotating valve trim at the same time to enable the rotating valve trim to return to a center more quickly, such that a delay of rotation stop is avoided.

16. The novel rotation control method for an excavator according to claim 9, wherein when the excavator rotates, the regulator controls the displacement of the main pump at the beginning of the rotation to prolong a loading time of the hydraulic oil in an oil inlet of the rotating motor to decrease of the flow rate of the hydraulic oil flowing back into a hydraulic oil tank from the overflow valve of the rotating motor; and two groups of said overflow valves and said one-way valves are connected in parallel and are located at two ends of the rotating motor respectively.

* * * * *